Patented Feb. 11, 1936

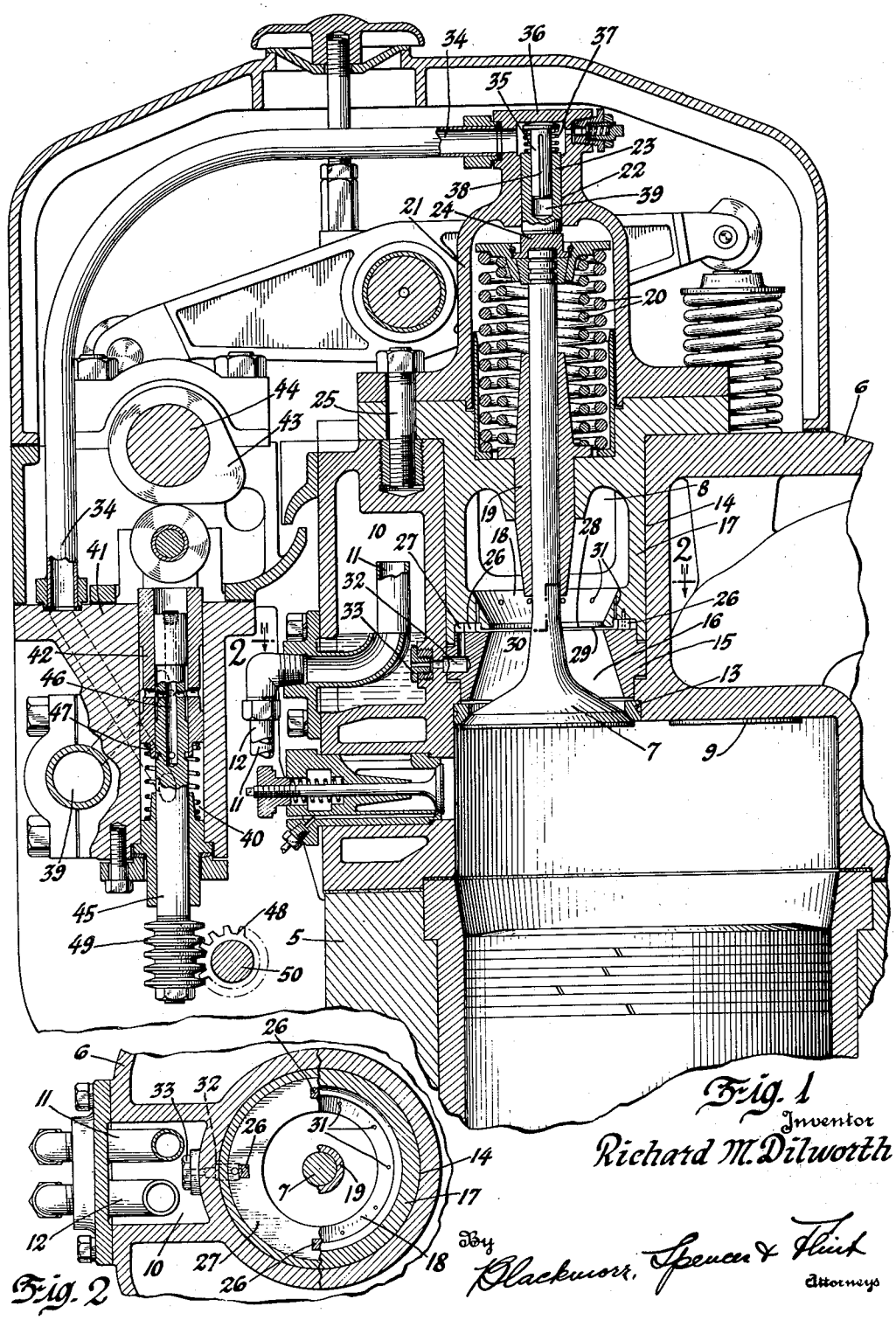

2,030,247

UNITED STATES PATENT OFFICE 2,030,247

OIL ENGINE

Richard M. Dilworth, Lakewood, Ohio, assignor to General Motors Corporation, Detroit, Mich., a corporation of Delaware Application February 23, 1933, Serial No. 657,964

5 Claims. (Cl. 123—28)

My invention relates to internal combustion engines designed to use oil as a source of power, and specifically to oil engines of the type wherein the oil used is supplied to the stream of air which is drawn into the engine cylinder during the intake or suction stroke thereof, and at a point adjacent and as near as practicable to the inlet valve of the engine; and which oil is vaporized inside the engine cylinder during the suction and compression strokes. My invention relates particularly to means for supplying oil to and to means for operating the inlet valve of such engines.

In oil engines of the type referred to the inlet valve is open and a stream of air carrying oil mixed with it enters the cylinder during the suction stroke; and during the compression, working, and exhaust strokes the inlet valve is closed and the air in the inlet passage leading thereto is at rest. The oil is drawn into the air from a reservoir wherein a constant level of oil is maintained by suction due to the piston; and the rate of flow of the oil stream (which starts from a condition of rest shortly after the beginning of each suction stroke) increases and reaches its maximum velocity (and consequently momentum) at or near the end of the suction stroke, at which time considerable energy is stored in the onwardly flowing stream of oil.

The flow of air through the air inlet passage and into the cylinder thus ceases (because of the closing of the inlet valve) at a time when the stream of oil is moving at or near its maximum velocity, and when considerable energy is stored therein the tendency of which is to maintain and continue the onward flow of the stream; and heretofore oil engines of this type have been wasteful of oil and unsatisfactory in their operation because the stream of oil, which should cease to flow when the inlet valve closes, continues its onward flow after such closing and discharges considerable oil into the air inlet passage when no air is flowing therethrough and which oil, therefore, is not properly mixed with the air and carried into the engine cylinder as it should be. In my invention, however, the flow of oil which occurs after the closing of the inlet valve and during the following compression stroke is diverted from the air inlet passage and flows instead into an equalizing chamber, from which it is withdrawn by the inflowing air stream at the beginning of and during the first part of the next suction stroke of the engine.

In the drawing wherein the preferred form of my invention is illustrated, although the same may be embodied in other forms so long as they are within the scope of the concluding claims:

Figure 1 is a view in section for the most part, showing so much of an oil engine of the type hereinbefore referred to as is necessary to an understanding of my invention.

Figure 2 is a view likewise fragmentary showing a section upon horizontal transverse planes indicated by the broken line 2—2, Figure 1, looking down.

Referring now to the drawing, the reference numeral 5 designates an engine cylinder, 6 the head thereof, 7 the inlet or supply valve, 8 an air inlet port through which air enters the cylinder, and 9 an exhaust valve; said valves being operated by suitable mechanism to secure a four-stroke cycle of operation of the engine as my invention is applicable only to engines operating upon a four-stroke cycle. My invention is furthermore limited to single engine cylinders in the sense that while an engine may be and commonly is made up of a plurality of cylinders, each cylinder has its individual oil supply device; and my invention relates for the most part to the oil supply mechanism for a cylinder, the same being repeated for each of the several cylinders which make up the engine as a whole.

The numeral 10 designates an oil supply reservoir. This is shown as a chamber formed in the head 6 by a suitable core, but the reservoir may be separate from the head if desired. A constant level of oil is maintained in this reservoir as by a conduit 11 through which oil is supplied by a suitable fuel pump and an overflow conduit 12 which returns surplus oil to a fuel tank from which the pump draws its supply. The means, however, whereby a constant level of oil is maintained in the reservoir 10 forms no part of the invention to which this present application relates and any means suitable to that end (whereby a constant level will be maintained) may be used.

The inlet valve 7 seats upward upon a valve seat 13; and above this seat and at the lower end of a cylindrical passage 14 in the head 6 is an annular member 15 having a tapering passage 16 as shown. Within the passage 14 and above the member 15 is an air inlet member 17 into which the air inlet port 8 leads, the said port, the air inlet member and the annular member 15 together providing an air supply passage as will be understood. The lower end 18 of the member 17 is inclined inward to provide, in connection with the tapering passage 16 of the member 15, a venturi as shown, through which air flows into the engine cylinder. The air inlet member 17 supports a guide 19 for the stem of the inlet valve, and springs 20 act as ordinarily in spring closed valves to hold the said valve upon its seat except when, as hereinafter appears, it is moved therefrom to permit the entrance of air and oil into the engine cylinder. Surrounding the springs 20 is a housing 21 having a guide 22 at its upper end for a plunger 23, the lower end of which engages a tappet 24 at the upper end of the valve stem to open the valve, said spring housing and said air inlet member 17 having flanges through which stud bolts 25 extend into the cylinder head to hold the parts in the assembled relation in which they are shown in Figure 1.

The annular member 15 and the air inlet member 17 are spaced apart as by stops 26 upon said annular member to thereby provide an annular equalizing oil chamber 27 of considerable capacity between the abutting ends of said two members, and the air inlet member is provided with a depending lip 28 whereby a narrow oil supply passage 29 is provided between the equalizing chamber and the air supply passage through which air flows into the engine cylinder. This oil supply passage is in effect an annular nozzle which, as will be seen, discharges into the air supply passage at the venturi 30 or most constricted part of said passage; whereby pronounced suction is exerted by the inflowing air and a flow of oil through the annular nozzle is induced by the air flowing into the engine cylinder, this being upon the suction stroke of the piston after the valve 7 has been moved off its seat, as will be understood. The passage 29, however, is narrow and of considerable length radially, and the head of oil in the equalizing chamber 27 slight, so that no appreciable flow of oil will occur through the said passage or nozzle during the compression, working and exhaust strokes of the piston when the inlet valve is closed.

A plurality of vent passages 31 of small diameter lead from a point in the air supply passage above and anterior to the venturi 30 into the equalizing chamber 27, these being shown as extending through the inclined inner end 18 of the air intake member. The upper ends of these vent passages therefore communicate with the interior of the air supply passage at a place where the pressure is much higher than at the venturi 30 where the oil supply nozzle 29 discharges into the stream of inflowing air. In fact the pressure at the upper ends of these vent passages is substantially atmospheric pressure, and a vent passage leading from the chamber 29 directly to the atmosphere may be substituted for them. The oil flows from the constant level reservoir 10 into the chamber 27 through an oil supply passage 32, the flow through which is limited by an orifice in a metering nozzle 33.

When the engine is in operation, the suction at the venturi 30 upon each suction stroke of the piston will induce a flow of oil through the narrow annular oil supply nozzle 29 and into the inflowing stream of air which oil (except for a short interval following the opening of the inlet valve and the beginning of the stroke as will later appear) will come directly from the oil reservoir 10, because the capacity of the equalizing chamber 27 is small as compared with the total amount of oil supplied to the engine cylinder during each suction stroke. During the greater part of each suction stroke the equalizing chamber 27 is therefore empty or substantially so, and the flow of oil is from the reservoir 10 through the oil supply passage 32 and annular oil discharge nozzle 29. The maximum volume of this flow is determined by the metering passage in the nozzle 33 which is chosen with reference to the maximum power output of the cylinder.

At or near the end of the suction stroke the flow of oil through the oil supply passage 32 will have reached its maximum velocity; and at this time the inlet valve 7 closes, the flow of air through the air supply passage ceases, and the suction at the venturi 30 and oil nozzle 29 rises to atmospheric pressure. In fact and because of the momentum of the stream of air in the inlet passage, the pressure at the oil supply nozzle tends to rise momentarily to a pressure slightly above atmospheric pressure.

When the suction at the oil nozzle 29 ceases due to the closing of the inlet valve 7, and the pressure at the venturi rises to atmospheric pressure, the oil is still flowing at or near its maximum velocity through the passage 32 and if not received and stored in the compensating chamber 27 would continue its flow through the oil nozzle and into the air supply passage wherein the air is now at rest. However and with the compensating chamber arranged as hereinbefore explained, the stream of oil (because of its momentum) will continue to flow; but instead of flowing into the air supply passage it will collect in the annular equalizing chamber 27 and rise to a greater or less extent therein, during which inflow the chamber 27 is vented to a region of atmospheric pressure through the passages 31. During this inflow and because of the comparatively large volume of the equalizing chamber and of the viscosity of the oil; because the chamber is vented to the atmosphere by the passages 31 and the passage through the nozzle 29 is a narrow passage of considerable length radially; and because of the absence of suction at the venturi 30; the oil will accumulate in the equalizing chamber 27 instead of flowing into the air inlet passage; and a considerable amount of oil will be present in said chamber by the time of the beginning of the next following suction stroke. This inflow will occur for the most part soon after the closing of the inlet valve because the momentum of the oil stream is then at its maximum; but it may occur during the following compression, working, and exhaust strokes if the flow, due to the energy stored therein, tends to continue that long.

At the beginning of the next following inlet stroke the oil stored within the equalizing chamber 27 is first drawn therefrom through the oil nozzle 29, the vent passages 31 permitting a sufficiently free flow of air into said chamber to allow the flow of oil therefrom in advance of the principal flow of oil from the reservoir 10 through the metering nozzle 33 and oil supply passage 32; it being obvious that the inertia of the oil in the supply passage 32 which is now at rest and the friction due to the small area of the said passage, particularly at the metering nozzle, will retard somewhat the initiation of a flow of oil through said passage. The equalizing chamber, however, is soon emptied, and during the rest and indeed during nearly all of the suction stroke the flow of oil is directly from the reservoir through the metering nozzle and oil supply passage to the oil supply nozzle 29, and through the same into the inflowing stream of air; there being, as hereinbefore explained, no substantial amount of oil within the equalizing chamber after the first part of the suction stroke. That is, the oil which enters the cylinder at the beginning of each suction stroke is the oil which entered the equalizing chamber during the compression stroke next preceding (although as explained some oil may flow into said chamber during the working and exhaust strokes), and which oil was stored therein until the beginning of such suction stroke; while the oil which enters the cylinder later in said suction stroke and after the equalizing chamber has been emptied comes directly from the oil reservoir 10.

The inlet valve 7 is moved off its seat by pressure of oil in a conduit 34 acting to depress the plunger 23, the lower end of which acts against the tappet 24 upon the upper end of the valve stem. This plunger is hollow as shown, and the numeral 35 designates a piston working within said plunger and the upper end of which abuts against a top wall at 36 of the spring housing 21. A spring 37 acts between the upper end of the plunger 23 and a flange at the upper end of the piston to keep the same in its normal uppermost position as shown, and said piston fits loosely within the plunger or has a longitudinally extending groove 38 whereby a dashpot is provided at 39, into and out from which oil may flow around the piston 35 or along the groove 38. It therefore follows that when pressure is applied to the oil within the conduit 34 the plunger 23 will be depressed and the valve 7 will be opened, oil meanwhile flowing into the dashpot 39; and that when the oil is relieved from pressure the springs 20 will close the valve 7 during which movement oil from the dashpot will escape around the piston or along the groove 38; the purpose of the dashpot being to cushion the closing of the inlet valve and prevent it from engaging violently with its seat, this cushioning being accomplished as will be appreciated by the same oil which is used to open the valve.

The oil within the conduit 34 is lubricating oil derived from a conduit 39 which is a part of the force feed lubricating system of the engine and, while the particular means for subjecting the oil in the said conduit 34 to pressure forms no part of the invention to which this present application relates, the following is a brief description of such means.

The conduit 34 leads from a chamber 40 in a housing 41, and 42 is a hollow sleeve operated by a cam 43 upon the cam shaft 44 of the engine. This sleeve has an elongated recess in its periphery into which oil flows from the conduit 39; and from which recess the oil flows through a similar peripheral recess in a cutoff plunger 45 and downward through a central passage 46 therein, and out through radial ports in said plunger and into the chamber 40.

The entire oil space is normally full of oil because the oil in the conduit 39 is under pressure and as the sleeve 42 is moved downward oil at first flows back from the chamber 40 through the passage 46 and into the conduit 39. Soon, however, the lower end 47 of the said sleeve interrupts such backward flow, and oil is trapped in the chamber 40 by the overrunning of the radial ports aforesaid in the cutoff plunger by said lower end. Thereafter and as the sleeve 42 continues its downward movement oil is forced from the chamber 40 into the conduit 34 and the inlet valve 7 is opened as hereinbefore explained. The cutoff plunger 45 is movable vertically by a pinion 48 and rack 49, the pinion being upon a shaft 50 which is manually or governor controlled to vary the position of the plunger and, consequently, the point of cutoff of the return flow of oil through the passage 46 by the lower end 47 of the sleeve 42, and the extent of opening movement imparted to the inlet valve 7 of the engine.

Having thus described and explained my invention I claim and desire to secure by Letters Patent:

1. In an oil engine, a cylinder, an intake passage leading thereinto, and a valve at the end of said passage for controlling the flow of air and fuel into said cylinder, said passage being reduced in area to provide a venturi adjacent and anterior to said valve; a permanently open oil supply nozzle discharging into said air supply passage at said venturi; an equalizing chamber from which oil may flow through said nozzle; a vent passage whereby said equalizing chamber is placed in communication with said air supply passage; an oil supply reservoir; and an oil supply passage through which oil is supplied from said reservoir to said equalizing chamber and to said oil supply nozzle.

2. In an oil engine of the class described and in combination with a positively opened inlet valve and an air supply passage leading thereto, and which passage is reduced in area to provide a venturi adjacent said valve; an annular equalizing chamber surrounding said air supply passage; a vent passage whereby said equalizing chamber is placed in communication with said air supply passage anterior to said venturi; a permanently open annular oil supply nozzle through which oil is supplied from said equalizing chamber to said air inlet passage at said venturi; an oil supply reservoir; and an oil supply passage through which oil is supplied from said reservoir to said equalizing chamber and to said oil supply nozzle.

3. In an oil engine of the class described and in combination with an inlet valve and an air supply passage leading thereto, and which passage is reduced in area to provide a venturi adjacent said valve; a permanently open oil supply nozzle discharging into said air supply passage at said venturi; an equalizing chamber from which oil may flow through said nozzle; a vent passage whereby said equalizing chamber is placed in communication with said air supply passage anterior to said venturi; an oil supply reservoir; an oil supply passage through which oil is supplied from said reservoir to said equalizing chamber and to said oil supply nozzle; and a metering nozzle associated with said oil supply passage and through which the oil flowing through said passage flows.

4. In an oil engine of the class described, a cylinder head having a cylindrical passage leading into the cylinder thereof; an annular member within said passage and arranged adjacent its lower end; a valve seat below said annular member; an inlet valve cooperating with said seat; an air inlet member within said cylindrical passage and arranged above said annular member, said air inlet member and said annular member together forming an air inlet passage and the two being so shaped as to provide a venturi adjacent said inlet valve; an annular equalizing chamber between said members and surrounding said venturi; a permanently open annular nozzle through which oil from said chamber is supplied to said air inlet passage at said venturi; vent passages in said air inlet member and whereby said equalizing chamber is placed in communication with said air inlet passage above said venturi; an oil supply reservoir; and an oil supply passage through which oil is supplied from said reservoir to said equalizing chamber and to said oil supply nozzle.

5. In an oil engine of the class described, a cylinder head having a cylindrical passage leading into the cylinder thereof; an annular member within said passage and arranged adjacent its lower end; a valve seat below said annular member; an inlet valve cooperating with said seat; an air inlet member within said cylindrical passage and arranged above said annular member, said air inlet member and said annular member together forming an air inlet passage and the two being so shaped as to provide a venturi adjacent said inlet valve; an annular equalizing chamber between said members and surrounding said venturi; a permanently open annular nozzle through which oil from said chamber is supplied to said air inlet passage at said venturi; vent passages in said air inlet member and whereby said equalizing chamber is placed in communication with said air inlet passage above said venturi; an oil supply reservoir formed in said cylinder head; an oil supply passage through which oil is supplied from said reservoir to said equalizing chamber and to said oil supply nozzle; and a metering nozzle arranged at the inlet end of said oil supply passage for restraining the flow of oil therethrough.

RICHARD M. DILWORTH.